United States Patent [19]
Knittle et al.

[11] Patent Number: 5,761,638
[45] Date of Patent: Jun. 2, 1998

[54] TELEPHONE NETWORK APPARATUS AND METHOD USING ECHO DELAY AND ATTENUATION

[76] Inventors: Curtis D. Knittle, 1585 S. Ptikin Ave., Superior, Colo. 80027; Paul D. Jaramillo, 5654 W. 75th Ave., Arvada, Colo. 80003; Frank H. Wu, 253 Lois Cir., Louisville, Colo. 80027

[21] Appl. No.: 406,352

[22] Filed: Mar. 17, 1995

[51] Int. Cl.$^6$ .................. G10L 5/06; G10L 9/00; H04M 1/64; H04M 1/00
[52] U.S. Cl. .................. 704/233; 379/67; 379/88; 379/410; 379/411
[58] Field of Search .................. 370/32.1; 379/88, 379/67, 410, 411; 704/233

[56] References Cited

U.S. PATENT DOCUMENTS

| | | | |
|---|---|---|---|
| 4,582,963 | 4/1986 | Danstrom | 179/170.2 |
| 4,914,692 | 4/1990 | Hartwell et al. | 379/410 |
| 4,987,569 | 1/1991 | Ling et al. | 370/32.1 |
| 5,054,053 | 10/1991 | Sakanishi et al. | 379/63 |
| 5,125,024 | 6/1992 | Gocken | 379/88 |
| 5,132,963 | 7/1992 | Ungerboeck | 370/32.1 |
| 5,155,760 | 10/1992 | Johnson et al. | 379/67 |
| 5,189,664 | 2/1993 | Cheng | 370/32.1 |
| 5,307,405 | 4/1994 | Sih | 379/410 |
| 5,319,636 | 6/1994 | Long et al. | 370/32.1 |
| 5,343,521 | 8/1994 | Jullien et al. | 379/410 |
| 5,400,399 | 3/1995 | Umemoto et al. | 379/388 |
| 5,473,686 | 12/1995 | Virdee | 379/410 |
| 5,511,064 | 4/1996 | Oh et al. | 370/15 |

OTHER PUBLICATIONS

Weinstein, "Echo Cancellation in the Telephone Network," IEEE Communications Society Magazine, Jan. 1977.
Komitake, "Fast Start–Up of an Echo Canceller in a 2–Wire Full–Duplex Modem," Links for the Future, 1984, pp. 360–364 (IEEE publ.).
Kamitake, "Fast Start–Up of an Echo Canceller in a 2–wire Full Duplex System," Links for the Future, IEEE Pub., pp. 360–364, 1984.
Rabiner et al., "Fundamentals of Speech Recognition," Prentice Hall, Englewood Cliffs, N.J., pp. 143–149, 1993.

*Primary Examiner*—David R. Hudspeth
*Assistant Examiner*—Robert Louis Sax
*Attorney, Agent, or Firm*—Thomas R. Marsh; Peter J. Kinsella

[57] ABSTRACT

The present invention provides a telephone network apparatus for performing speech recognition services in a telephone system in substantially real time. The apparatus uses a telephone channel signal to determine the echo delay of a telephone channel and then uses this delay to configure an echo cancellation filter for use in performing speech recognition. Use of echo delay in configuring the filter allows the echo cancellation function to be done using much less computational time than would be needed without its use, thereby granting a speech recognition unit greater access to a resident microprocessor to perform its function in substantially real time.

9 Claims, 6 Drawing Sheets

TELEPHONE NETWORK APPARATUS AND METHOD USING ECHO DELAY AND ATTENUATION

FIELD OF THE INVENTION

The invention relates generally to telephone networks, and, more particularly, to a telephone network apparatus which is capable of supplying speech recognition services in a telephone network in substantially real time.

BACKGROUND OF THE INVENTION

In its simplest form, a telephone network includes a number of user devices connected to a central switching apparatus. When a first user wants to communicate with a second user, he signals the switching apparatus to connect him to the second user, thereby opening a communication channel between the two. Once this channel is open, each user is able to transmit and receive information to and from the other over the network. The communication that takes place between users can include such things as a conversation between two persons, data transfer between two computers, or the supplying of services to a user by an automated service delivery system. The subject invention is concerned primarily with this third type of telephonic communications Any number of different services can be delivered over a telephone network. These services can be fairly simple, such as playing a weather recording for a caller, or very complex, such as applications involving speech recognition.

The more complex services can require vast amounts of computational time in a resident microprocessor to perform adequately, and, therefore, may not be able to perform in substantially real time when computational resources are shared by auxiliary functions.

One auxiliary function which consumes computational time in a telephone subsystem, and therefore limits the systems ability to operate in real time, is echo cancellation. Echo cancellation is the process of suppressing the portion of a received signal which is due to reflections of previously transmitted signals and allowing only the portion containing the desired information to proceed through for processing. Echo cancellation can be very important in an automated service delivery system as echoes can seriously degrade the performance of such systems. For example, in a system which performs speech recognition, the system will prompt a user to supply certain verbal information which the system then processes upon reception. If the user is familiar with the prompt and does not wish to listen to it, the system will allow him to begin his response before the prompt has ended and will terminate the transmission of the prompt upon the detection of the initiation of a user response. There will be a delay between the time the user begins his response and the time the system terminates the transmission of the prompt, and during this period there will be both a response signal and a prompt echo signal being sent to the system through the channel. The system must be capable of cancelling this prompt echo signal if accurate speech recognition is to be performed. Similarly, the system must be capable of cancelling the prompt echo signal even if the user does not initiate his verbal response before the prompt ends to prevent the system from misinterpreting the prompt echo signal as a verbal response.

To overcome the problems created by echo signals, echo cancellation devices are employed. One type of echo cancellation device makes use of a transversal filter, which is essentially a tapped-delay line having weighted coefficients associated with each tap. The coefficients of the filter can be set in such a way that when a transmit signal is simultaneously transmitted on the channel and applied to the input of the filter, the output of the filter will be an estimate of the echo signal received from the channel. This estimate can then be subtracted from the actual echo signal received from the channel, thereby cancelling the echo from the received signal. A transversal filter which has the ability to automatically adapt to changing channel characteristics is commonly referred to as an adaptive filter.

Determination of the proper filter coefficients is an iterative process which is usually done during a training stage before any actual two way communication takes place.

A training signal is transmitted over the channel and the resultant echo signal is processed by the adaptive filter using an algorithm. The algorithm determines how the coefficients of the filter should be changed to sufficiently reduce an error signal created by subtracting the echo signal estimate from the actual received echo. Once the error signal has been sufficiently reduced, convergence of the filter is said to have occurred and the tap weights are properly set for echo cancellation during two way communications.

The adaptive filter, in general, must be as long as the longest expected channel delay for which the filter will be required to cancel echoes. The longer the filter, the more filter taps are required for effective cancellation. The more filter taps that are used, the greater the number of mathematical calculations that must be performed during both the training stage and the echo cancellation stage. For example, the filter will require N multiplications and N additions to compute each discrete sample of the echo estimate signal. This large number of required calculations greatly increases the computational time in a resident microprocessor that must be dedicated to echo cancellation and therefore reduces the time available to perform speech recognition functions. Because the computational time available to speech recognition is limited, the system will not be able to operate in substantially real time and undesirable delays will result.

A need therefore exists for a method and apparatus for reducing the computational time required to perform the echo cancellation function in a system which performs speech recognition services.

SUMMARY OF THE INVENTION

An object of the present invention is to provide a telephone network apparatus capable of delivering services to users over a telephone.

Another object of the present invention is to provide a telephone network apparatus capable of performing speech recognition functions in substantially real time.

Yet another object of the present invention is to provide a telephone network apparatus requiring less computational time to perform echo cancellation than past systems.

In one embodiment, the apparatus comprises a control unit to control the timing and operation of the various components of the apparatus, a speech recognition unit, an adaptive filter, an echo cancellation unit, a prompt generator for prompting responses from a user, a chirp signal generator, a matched filter, an endpoint detection unit, and a plurality of double throw switches. The apparatus receives a call from a user requesting services and immediately transmits a chirp signal to the user device through the newly opened telephone channel. The chirp signal travels down the channel and is partially reflected by the user device at the other end, creating an echo signal which is returned to the apparatus. Upon reception, the echo signal is applied to a matched filter. The output of the matched filter is then analyzed to determine certain attenuation characteristics of the channel, which the system uses to determine whether echo cancellation should be performed. If the system determines that echo cancellation should not be performed, it causes the entire echo cancellation procedure to be bypassed and delivers any signal received from the channel directly to the endpoint detection unit. If the system determines that echo cancellation should be performed, it proceeds to determine the echo delay of the channel from the output of the matched filter. The control unit uses the time period of the echo delay to initialize the delay elements in the tapped delay line of the adaptive filter in such a way as to require much less computational time to reach convergence and to perform echo cancellation.

Once convergence of the filter is realized, the apparatus transfers the filter configuration data from the adaptive filter to the echo cancellation unit. The apparatus is now ready to perform echo cancellation. The control unit causes an inquiry prompt to be delivered to the user requesting verbal information. The signal which returns from the channel may contain the user's verbal response, the prompt echo, or a combination of the two. The echo cancellation unit will cancel the prompt echo portion of the signal received from the channel and allow the remainder of the signal to proceed to the endpoint detection unit. The endpoint detection unit analyzes the signal to determine the presence or absence of a user's verbal response. If a user's verbal response is not detected, the system simply waits for the next signal to be received from the channel. If a verbal response is detected, the endpoint detection unit transfers the signal to the speech recognition unit for processing. The speech recognition unit, under the control of the control unit, analyzes the verbal response signal to determine its content. This operation demands a very long period of the microprocessor's available computational time. Because less of the microprocessor's available computational time is dedicated to the echo cancellation function, the invention is capable of operating in substantially real time. It should be appreciated, however, that even though the invention is capable of operating in substantially real time, there may be applications where the invention will not operate in substantially real time because, for example, a more complex speech recognition algorithm is being used. Situations such as this are still considered to be within the purview of the present invention.

DETAILED DESCRIPTION

Figure 1A:
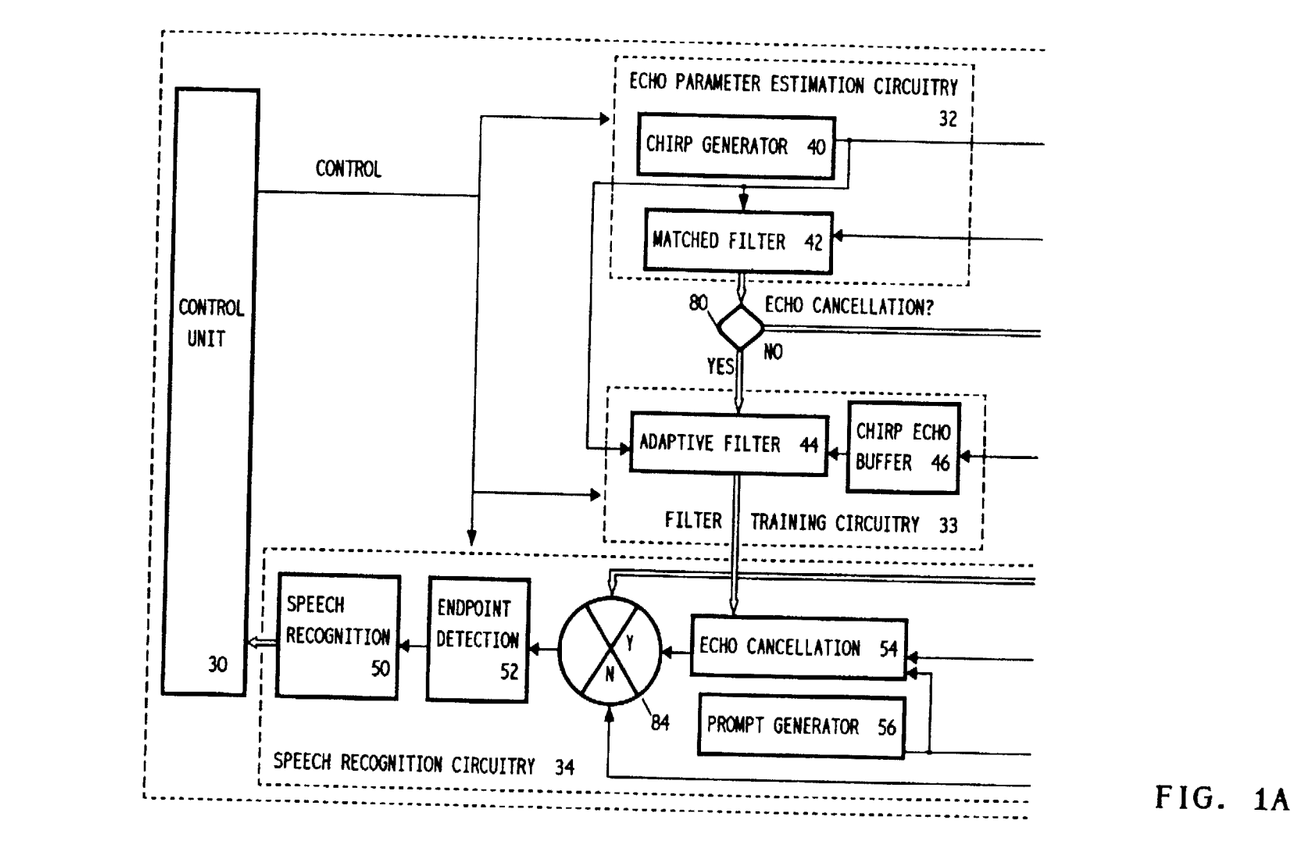
FIGS. 1A–1B constitute a block diagram of a telephone system including a preferred embodiment of the present invention.
Figure 1B:
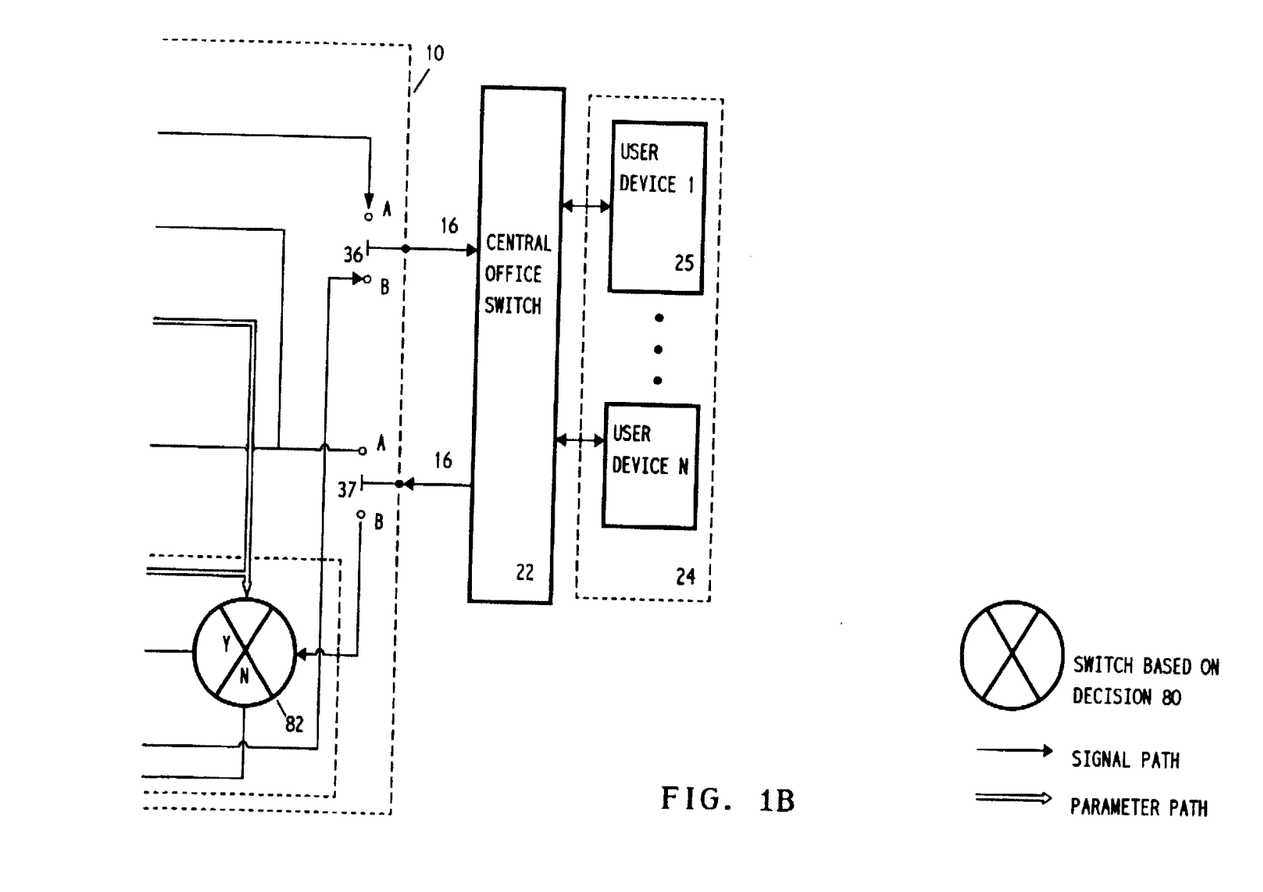

In accordance with the preferred embodiment of the present invention, as illustrated in FIGS. 1A–1B, an apparatus 10 is provided for delivering speech recognition services in a telephone system, in substantially real time. As can be seen in FIGS. 1A–1B, the apparatus 10 is part of a telephone system 20 also comprising a central office switch 22 and a plurality of user communication devices 24. The apparatus 10 is connected via trunk line 16 to central office switch 22 for two way communication. The plurality of user devices 24 are connected in parallel to central office switch 22, also for two way communication. Accordingly, a user at any one of the user devices 25 may open a channel of communication between himself and apparatus 10 for performance of speech recognition services in substantially real time.

Apparatus 10 includes a control unit 30 for controlling the timing and operation of echo parameter estimation circuitry 32, filter training circuitry 33, speech recognition circuitry 34, and decision unit 80. Control unit 30 can include, for example, a 486 microprocessor or similar device. Echo parameter estimation circuitry 32 is responsible for creating a signal from which estimates of the echo delay and attenuation characteristics of the newly opened communication channel can be determined and for providing this signal at an output. Decision unit 80 is responsive to the signal output from echo parameter estimation circuitry 32 for determining whether echo cancellation should be performed based on a determination of the attenuation characteristics of the channel. If decision unit 80 finds that echo cancellation should be performed, it determines the echo delay estimate of the channel from the output signal of the echo parameter estimation circuitry 32 and delivers it to the filter training circuitry 33. If decision unit 80 finds that echo cancellation should not be performed, it causes the filter training circuitry 33 to be bypassed and it sends a signal to the speech recognition circuitry 34 which prevents it from performing echo cancellation on signals subsequently received from the channel.

Filter training circuitry 33 is responsive to the echo delay estimate received from decision unit 80 for configuring an adaptive filter for echo cancellation whenever decision unit 80 decides that echo cancellation should be performed. Speech recognition circuitry 34 is responsible for performing echo cancellation on echo signals received from the channel when echo cancellation is to be performed and for processing any user's verbal response signals which may also have been received.

Apparatus 10 also includes double throw switches 36 and 37 which are responsible for directing signal flow into and out of apparatus 10 under the control of control unit 30. Double throw switch 36 communicates with the outgoing path of trunk line 16 for controlling signal flow out of apparatus 10. Similarly, double throw switch 37 communicates with the incoming path of trunk line 16 for controlling signal flow into apparatus 10. The double throw switches 36 and 37 are each capable of being in one of two positions, Position A or Position B, at any one time, and both switches must be in the same position at the same time.

Figure 2A:
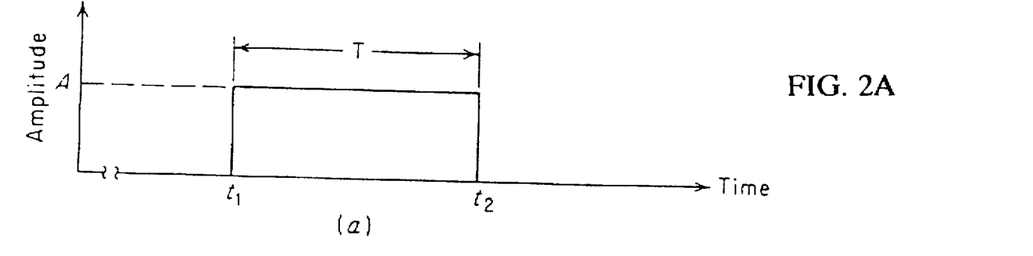
FIGS. 2A–2C are graphical representations of a typical chirp signal.
Figure 2B:
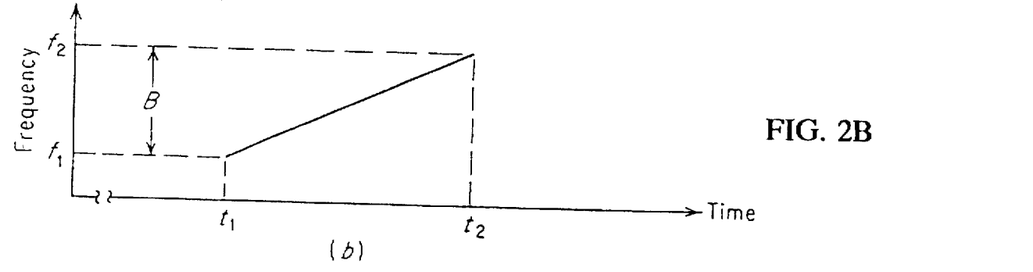
Figure 2C:
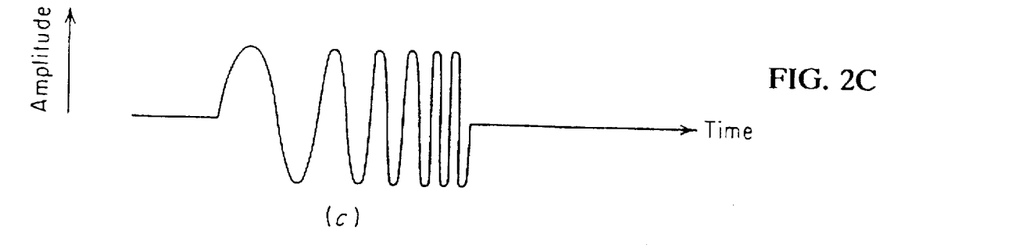

Echo parameter estimation circuitry 32 includes chirp signal generator 40 for generating chirp signals to be used in characterizing the telephone channel. As illustrated in FIGS. 2A, 2B, and 2C, a chirp signal is a rectangular pulse of constant amplitude alternating current having linear frequency modulation. Mathematically, a real chirp signal may be represented in the continuous time domain as:

$$A_{amp} \cos(2\pi(f_1 t + 0.5 a t^2))$$

for $0 \leq t \leq T$, or in the discrete-time domain as:

$$A_{amp} \cos(2\pi(f_1 nT_s + 0.5 a n^2 T_s^2))$$

for n=0, 1, 2, . . . , T/T$_s$, where f$_1$ is the initial chirp frequency, a is a constant equal to (f$_2$–f$_1$)/T, f$_2$ is the final chirp frequency, T is the chirp signal length in seconds, T$_s$ is the sampling interval, and A$_{amp}$ is the amplitude of the transmitted chirp signal. As will become apparent shortly, use of a chirp signal allows apparatus 10 to determine the echo delay estimate of the channel to a high degree of accuracy.

Chirp signal generator 40 is connected at an output to terminal A of double throw switch 36. When double throw switch 36 is in Position A, the output of chirp signal generator 40 may be transmitted over trunk line 16 to central office switch 22 and ultimately to one of said plurality of user devices. This signal path defines the telephone channel. When a chirp signal is transmitted over this channel, a chirp echo signal will be reflected back from the user device through central office switch 22 and trunk line 16 and into terminal A of double throw switch 37 of apparatus 10. Control unit 30 includes means for preventing the transmission of a speech signal from user device 25 until after the chirp echo signal is received by apparatus 10.

Figure 2D:
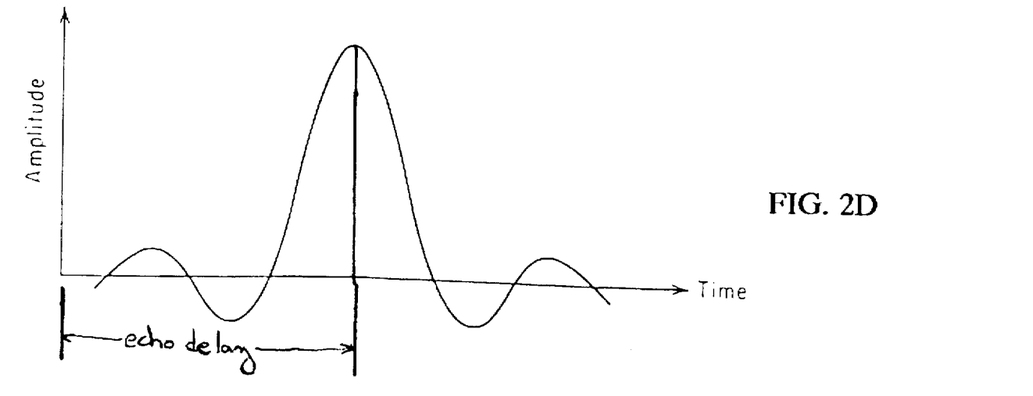
FIG. 2D is a graphical representation of the output of a matched filter when a chirp waveform is applied at its input.

Also included in echo parameter estimation circuitry 32 is matched filter 42 for processing the chirp echo signal received from the telephone channel to create the signal from which the echo delay and attenuation estimates may be determined. A matched filter is a device which has an impulse response which is the time reverse of the transmitted signal. Matched filter 42 will be filtering echoed chirp signals, and, therefore, its impulse response must be the time reverse of the transmitted chirp signal. For example, if c(t), $0 \leq t \leq T$, represents the transmitted chirp signal in continuous time, then the impulse response of the matched filter, h(t), will be:

$$h(t) = c(T-t)$$

for $0 \leq t \leq T$, and if c(n), $0 \leq n \leq N$, represents the discrete time transmitted chirp signal, then the corresponding discrete time matched filter impulse response, h(n), will be:

$$h(n) = c(N-n)$$

for $0 \leq n \leq N$. Matched filter 42 is operatively connected at a first input to the output of chirp generator 40 and at a second input to terminal A of double throw switch 37. When double throw switch 37 is in Position A, matched filter 42 will be able to receive a chirp echo signal from the channel which it filters with the time reversed transmitted chirp signal. The output signal of matched filter 42 will resemble the familiar sin (x)/x pattern of FIG. 2D, where the peak of the pattern occurs at a time corresponding to the echo delay of the channel and where the level of the peak indicates the attenuation of the channel.

Mathematically, for the more general continuous-time, complex valued chirp signal $$A_{amp} \exp(j 2\pi(ft + 0.5 a t^2)),$$

the magnitude of the output of the matched filter can be represented as follows:

$$R(\tau) = A^2_{amp}(T-|\tau|) \sin[\pi a \tau (T-|\tau|)]/[\pi a \tau (T-|\tau|)]$$

where T is the channel delay, T is the chirp signal length, a is a constant equal to (f$_2$–f$_1$)/T, f1 is the initial chirp frequency, and f2 is the final chirp frequency. The main lobe of this signal will be relatively narrow, having a width equal to 2/aT, thereby allowing the echo delay of the channel to be found to a high degree of accuracy.

Filter training circuitry 33 includes adaptive filter 44 and chirp echo buffer 46. Chirp echo buffer 46 is operatively connected at an input to terminal A of double throw switch 37 for receiving a chirp echo signal from the channel when the switch is in Position A. The buffer will then store the chirp echo signal in its memory until adaptive filter 44 is ready to process it. The use of chirp echo buffer 46 allows apparatus 10 to fully configure adaptive filter 44 using only one transmitted chirp. It should be appreciated that an alternative approach would be to adapt the filter 44 on two or more consecutive chirps without the use of buffer 46. Adaptive filter 44 is operatively connected at a first input to the output of chirp generator 40 for receiving a replica of the transmitted chirp signal. Adaptive filter 44 is also operatively connected at a second input to the output of chirp echo buffer 46 for receiving the chirp echo signal stored in the buffer. In addition, adaptive filter 44 is operatively connected at a third input to the output of decision unit 80 for receiving the echo delay estimate. The filter 44 uses these inputs to configure itself for echo cancellation.

As illustrated in FIG. 1A, speech recognition circuitry 34 includes an echo cancellation unit 54 for cancelling echoes received from the channel by apparatus 10. Echo cancellation unit 54 is operatively connected at one input to an output of adaptive filter 44 for receiving filter configuration data needed to perform echo cancellation. The unit 54 is also connected at an input to decision switch 82 and at an output to decision switch 84 for selectively bypassing the echo cancellation unit 54 in response to a signal from decision unit 80. Decision switch 82 is operatively connected at an input to terminal B of double throw switch 37 for receiving signals from the channel whenever switch 37 is in Position B and for transferring these signals to echo cancellation unit 54 whenever echo cancellation is being used. If echo cancellation is not being used, decision switch 82 will direct all signals received from the channel to decision switch 84, thereby bypassing echo cancellation unit 54.

Speech recognition circuitry 34 also includes a prompt generator 56 for prompting a user over the channel for a verbal response. Prompt generator 56 is connected at an output to terminal B of double throw switch 36 and is capable of transmitting a prompt signal over the channel whenever the switch is in Position B. Prompt generator 56 is also connected at the same output to an input of echo cancellation unit 54 for supplying the prompt signal to that unit for use in echo cancellation. Echo cancellation unit 54 is then able to receive a signal from the channel having both a prompt echo portion and a user verbal response portion, cancel the echo portion of the received signal, and allow the verbal response portion to proceed through for speech recognition processing.

Also included in speech recognition circuitry 34 is endpoint detection unit 52 for determining whether a signal received from the channel includes a user verbal response portion. If a verbal response portion is present, endpoint detection unit 52 detects the endpoint of the signal and then allows the signal to proceed to an output. If a verbal response portion is not present, endpoint detection unit 52 does not allow the signal to proceed.

Further included in speech recognition circuitry 34 is speech recognition unit 50. Speech recognition unit 50 is operatively connected at an input to the output of endpoint detection unit 52 for processing the user's verbal response signal outputted by that unit. The speech recognition unit 50 also receives endpoint information from the endpoint detection unit 52 which it uses when processing the verbal response signal. The speech recognition unit 50 is connected at an output to control unit 30 to which it sends the results of the speech recognition after processing.

Figure 4A:
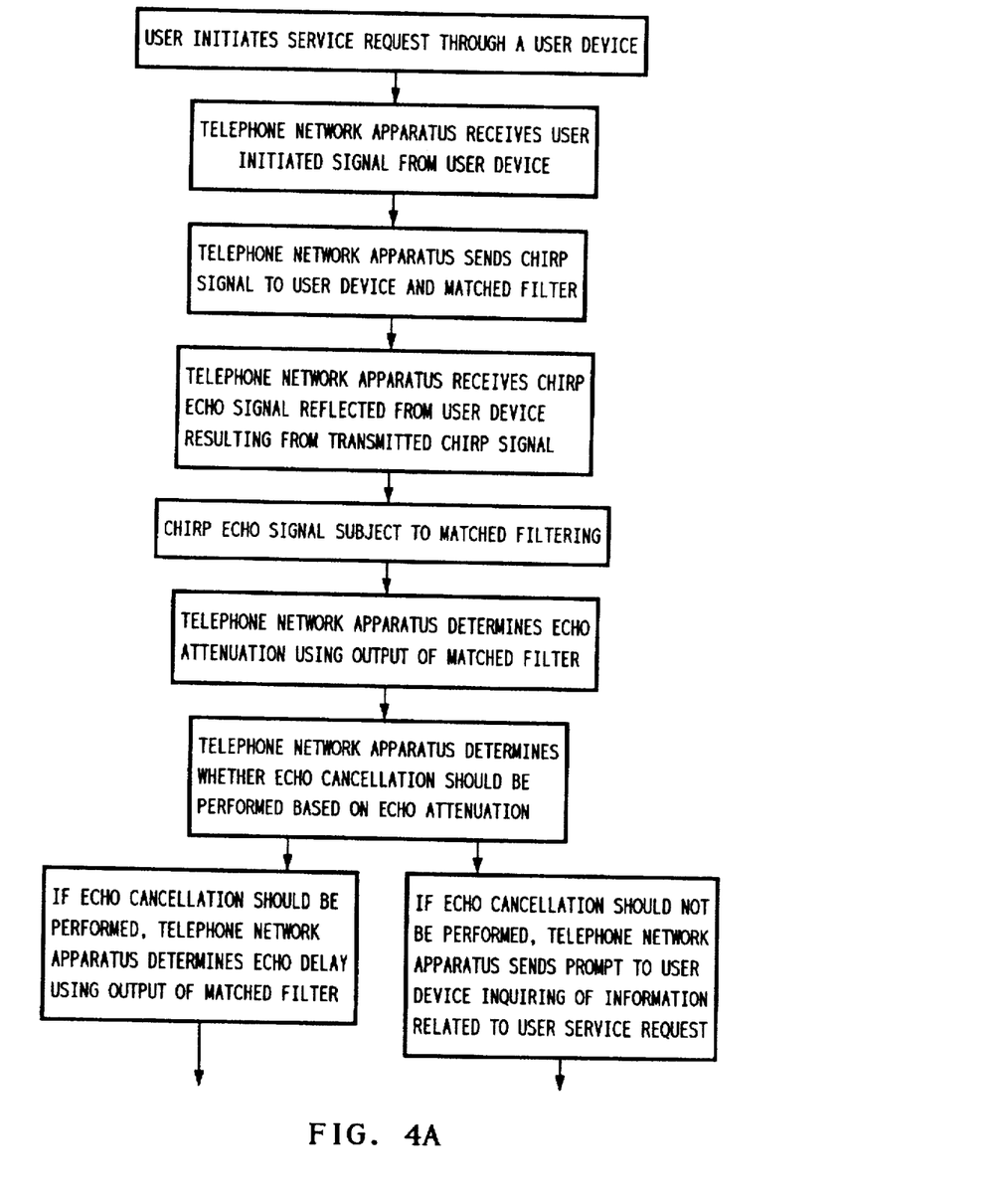
FIGS. 4A–4B are an operational flow chart outlining the steps taken during the operation of a preferred embodiment of the present invention.
Figure 4B:
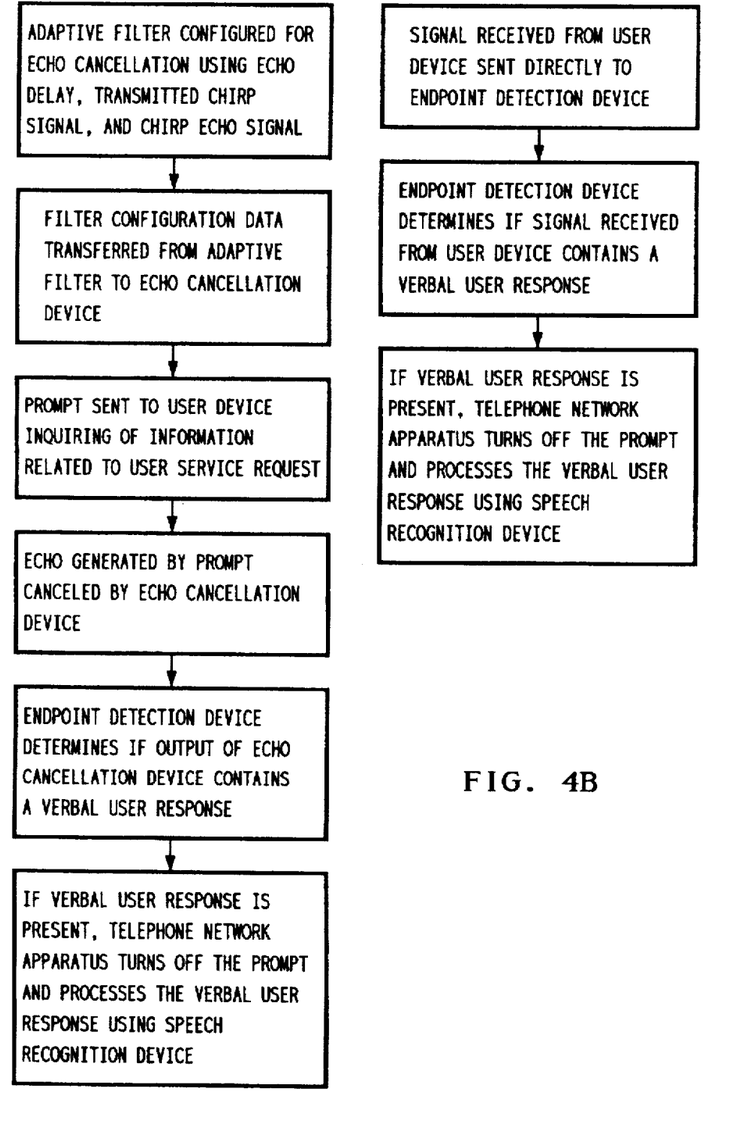

Operation of the invention in accordance with its preferred embodiment generally follows the steps outlined in the flow chart of FIGS. 4A–4B. Unless otherwise stated, the following description of the operation of apparatus 10 will assume that echo cancellation is to be performed. It should be appreciated that in the preferred embodiment of the present invention, control unit 30 will be able to terminate operation of the system at any time during the delivery of services to a user if a system error occurs.

Users who wish to have services performed by apparatus 10, and who have a user device 25 connected to central office switch 22, simply dial the number of the apparatus, and, if the apparatus is available, a channel of communication is opened up between the user device 25 and the apparatus 10. After a channel has been opened up, control unit 30 immediately signals double throw switches 36 and 37 to switch to Position A. Once the switches are set, control unit 30 causes chirp generator 40 to transmit a chirp signal through the channel toward the user device. This chirp signal is also delivered to matched filter 42 and adaptive filter 44 for later use.

The chirp signal travels through the channel until it reaches the user device 25 at the other end, where it is partially reflected. This partial reflection creates a chirp echo signal which is sent back through the channel toward apparatus 10. Once received by apparatus 10, the chirp echo signal is directed by double throw switch 37 to matched filter 42 and to chirp echo buffer 46 which stores a replica of the signal. Matched filter 42 filters the echo signal with the time reversed transmitted chirp signal resulting in a signal resembling the sin (x)/x amplitude characteristic of FIG. 2D being created at an output. This output signal is delivered to decision unit 80 which analyzes the signal to determine whether echo cancellation should be performed.

In the preferred embodiment of the present invention, the determination as to whether echo cancellation should be performed is comprised of two steps. During the first step, decision unit 80 analyzes the output signal from the echo parameter estimation circuitry 32 to determine the amplitudes of the largest and second largest peaks of the signal. If an echo is present, the largest peak is directly proportional to the amplitude of the received echo signal, while the second largest peak indicates the relative noise level present in the received signal. Decision unit 80 divides the amplitude of the first peak by the amplitude of the second peak to create a ratio indicative of whether effective cancellation of echoes is possible. A ratio below a first threshold value indicates that either the received echo is too weak or the channel noise level is too high to effectively perform echo cancellation. If this is the case, decision unit 80 causes filter training circuitry 33 and echo cancellation unit 54 to be bypassed and control unit 30 causes double throw switches 36 and 37 to switch to position B. A ratio above the first threshold value indicates that the received echo signal is strong enough for effective echo cancellation to be performed. If this is the case, decision unit 80 proceeds to the next step of the determination.

During the second step of the determination as to whether echo cancellation should be performed, decision unit 80 first computes the amplitude of the echoed chirp signal, $B_{amp}$, as follows: Given that P represents the largest peak in the matched filter output, and $A_{amp}$ equals the amplitude of the transmitted chirp signal, then $$B_{amp} = \frac{2P}{A_{amp}}.$$

Decision unit 80 then computes the ratio of $B_{amp}$ to $A_{amp}$. This ratio measures the attenuation characteristic of the channel and will be referred to herein as the attenuation estimate. If the attenuation estimate is below a second threshold value, echo cancellation is not necessary and decision unit 80 will cause filter training circuitry 33 and echo cancellation unit 54 to be bypassed. If this is the case, control unit 30 will cause double throw switches 36 and 37 to switch to position B. If the attenuation estimate is above the second threshold value, echo cancellation should be performed and decision unit 80 proceeds to analyze the output signal of the echo parameter estimation circuitry 32 to determine the echo delay estimate of the channel.

The echo delay estimate of the channel is determined to a high degree of accuracy by measuring the elapsed time between transmission of the original chirp signal and the occurrence of the largest peak in the sin (x)/x pattern of the output signal of the echo parameter estimation circuitry 32. After the echo delay estimate is determined, decision unit 80 delivers the estimate to filter training circuitry 33 for use in configuring adaptive filter 44.

Figure 3:
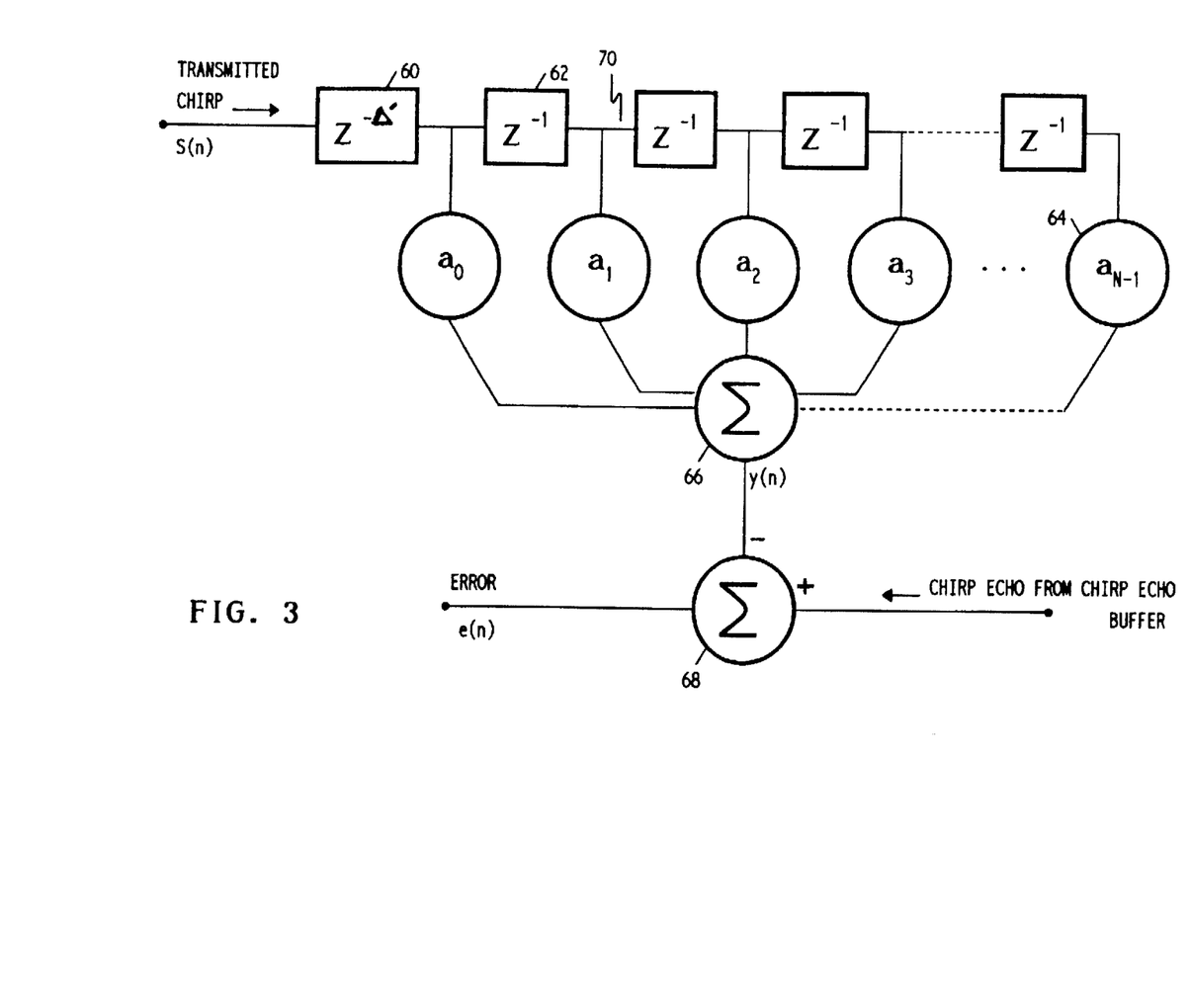
FIG. 3 is a block diagram of an adaptive filter that is used in a preferred embodiment of the present invention, showing the arrangement of the delay elements with respect to the measured channel delay.

As illustrated in FIG. 3, adaptive filter 44 comprises: a tapped delay line 70 having a bulk delay element 60 and a plurality of standard delay elements 62, a plurality of tap coefficient multipliers 64, a summing amplifier 66 for summing the weighted tap results, and a difference amplifier 68 for subtracting the result of the summing amplifier 66 from a received echo signal to produce error signal e(n). The standard delay elements 62 each represent a standard delay increment required for successful filter adaptation. Bulk delay element 60 is the first delay element in tapped delay line 70 and its delay value is calculated by control unit 30 to center the adaptive filter 44 around the echo delay estimate of the channel. This centering is accomplished by setting the delay value of bulk delay element 60 according to the following formula:

$$\text{Bluk delay} = \Delta' = \begin{cases} \Delta - (N-1)/2 & N \text{ odd} \\ \Delta - N/2 & N \text{ even} \end{cases}$$

where N is the total number of delay line taps and $\Delta$ is the echo delay estimate.

Once the value of bulk delay element 60 is determined using the previous equation, and the filter is effectively centered, the tap coefficient multipliers 64 must be adapted for performance of echo cancellation. As illustrated in FIG. 3, adaptive filter 44 receives as inputs both the chirp signal which was originally transmitted through the channel and the stored chirp echo signal from chirp echo buffer 46. The chirp signal is applied to tapped delay line 70 and the weighted tap results are summed once every standard delay increment to create discrete time signal y(n). This signal may be represented mathematically as follows:

$$y(n) = a_0(n)s(n-\Delta') + a_1(n)s(n-\Delta'-1) + a_2(n)s(n-\Delta'-2) + \ldots + a_{N-1}(n)s(n-\Delta'-(N-1))$$

where s(n) is the sampled transmitted chirp signal, N is the total number of filter taps, $\Delta'$ is the bulk delay, and n is a discrete time variable. Discrete time signal y(n) is then subtracted from the stored chirp echo signal received from chirp echo buffer 46 to create a discrete time error signal e(n). Control unit 30 uses the error signal to constantly update coefficient values $a_i(n)$ according to the following least-mean-square stochastic gradient algorithm:

$a_i(n+1)=a_i(n)-2\mu e(n)s(n-\Delta'-i)$ where μ is a constant, and i=0, 1, ..., N−1. This algorithm operates to minimize the discrete time error signal e(n) produced by the adaptive filter. Once the error signal is minimized, convergence is said to have occurred and the filter is fully configured for echo cancellation. In the preferred embodiment, the present invention utilizes a filter length that adequately models only the communication channel, unconstrained by the echo delay value. The filter length is between 5 and 50 taps, with a preferred value of 25 or less for a typical two-way communication channel.

After adaptive filter 44 has been fully configured for echo cancellation, control unit 30 causes double throw switches 36 and 37 to switch to Position B. Control unit 30 then causes adaptive filter 44 to transfer its filter configuration data to echo cancellation unit 54 which will be responsible for performing echo cancellation for apparatus 10. The control unit also causes prompt generator 56 to transmit an inquiry prompt over the channel to user device 25, requesting a verbal response. This prompt will create an echo at user device 25 which is reflected back toward apparatus 10 and cancelled in echo cancellation unit 54 upon reception.

The user may wait until the prompt has ended to initiate his verbal response or he may initiate it before the prompt has ended. If the user initiates his response before the prompt has ended, control unit 10 detects the condition and terminates the transmission of the prompt. There is a short period, however, during which both the verbal response of the user and the prompt echo signal are propagating together through the channel toward apparatus 10. When this composite signal reaches apparatus 10 it will be directed to echo cancellation unit 54 by double throw switch 37 and decision switch 82, wherein the prompt echo portion will be cancelled. The verbal response portion will then proceed to endpoint detection unit 52.

Endpoint detection unit 52 receives the echo free verbal response signal from echo cancellation unit 54 and determines the location of the endpoint of the signal. It then sends the verbal response signal and the endpoint information to speech recognition unit 50 for processing. Speech recognition unit 50 processes the verbal response signal under the control of control unit 30. It then communicates the content of the verbal response signal to control unit 30 in a form which the control unit understands. The control unit 30 reacts to the verbal response of the user by either sending another speech prompt to the user requesting more information or by performing the services requested by the user. After all of the requested services have been delivered to the user, the apparatus will disconnect from the user and await further requests.

If the signal received from the channel contains only a prompt echo portion with no accompanying verbal response portion, the prompt echo portion will still be cancelled in echo cancellation unit 54. The signal emerging from the echo cancellation unit 54 will be comprised primarily of channel noise and will be delivered to endpoint detection unit 52. Endpoint detection unit 52 will analyze the signal to determine that it contains no verbal response portion, and, as a result of this determination, will not send the signal to the speech recognition circuitry 50.

If decision unit 80 has decided that echo cancellation should not be performed, then any signal received from the channel will be sent directly to endpoint detection unit 52. These signals may still have a small prompt echo portion because echo cancellation was bypassed, but the level of the prompt echo portion should be low enough that it does not affect the operation of either the endpoint detection unit 52 or the speech recognition unit 50. These two units should operate substantially the same whether echo cancellation is being used or not.

In another embodiment of the present invention, an apparatus is provided which is capable of cancelling echoes created at more than one location in the telephone channel. Such an apparatus is useful when speech recognition services are to be provided from a location remote from the central office because this arrangement includes two hybrids in the telephone channel: one associated with the user and one associated with the apparatus. The hybrid associated with the user will create a far echo signal and the hybrid associated with the apparatus will create a near echo signal, both of which require cancellation. This embodiment includes all of the same components as the embodiment illustrated in FIG. 1 and, in addition, includes a second filter training circuitry and a second echo cancellation unit, both connected in series with the respective first units. The first echo cancellation unit receives its configuration data from the first filter training circuitry to cancel the near echo signal and the second echo cancellation unit receives its configuration data from the second filter training circuitry to independently cancel the far echo signal. Theoretically, this arrangement can be expanded to cancel echoes created from any number of sources.

Although the present invention has been described in conjunction with its preferred embodiment, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method for providing speech recognition in a telephone system, comprising:

receiving a telephone signal from a first of a plurality of user communication devices;

sending a chirp signal to said first user communication device;

receiving an echo signal based on said chirp signal, obtaining attenuation data using at least one of said chirp signal and said echo signal; determining whether echo cancellation should be performed, using said attenuation data;

obtaining a time delay using said chirp signal and said echo signal;

determining a value for a bulk delay filter element using said time delay;

using an adaptive filter to determine one or more filter coefficient values for performing echo cancellation;

configuring echo cancellation means using at least said value for said bulk delay filter element and said one or more filter coefficient values;

receiving a speech signal from said first user communication device after said configuring step; and     recognizing said speech signal;

wherein said steps of obtaining attenuation data and determining whether echo cancellation should be performed are performed after said step of receiving said echo signal.

2. A method, as claimed in claim 1, wherein:

said step of obtaining said attenuation data includes:

matched filtering said echo signal with a time reversed version of said chirp signal to create an output signal; and obtaining an amplitude of the largest peak of said output signal and an amplitude of the next largest peak of said output signal; and said step of determining whether echo cancellation should be performed includes:

determining a ratio using said amplitude of the largest peak and said amplitude of the next largest peak; and comparing said ratio to a threshold value.

3. A method, as claimed in claim 1, wherein:

said step of obtaining said attenuation data includes:

matched filtering said echo signal with a time reversed version of said chirp signal to create an output signal; and obtaining an amplitude of the largest peak of said output signal and an amplitude of said chirp signal; and said step of determining whether echo cancellation should be performed includes:

determining a ratio using said amplitude of the largest peak of said output signal and said amplitude of said chirp signal; and comparing said ratio to a threshold value.

4. An apparatus, as claimed in claim 3, wherein:

said step of determining a ratio includes:

determining an estimate of an amplitude of said echo signal using said amplitude of the largest peak of said output signal and said amplitude of said chirp signal; and determining a ratio of said estimate of said amplitude of said echo signal to said amplitude of said chirp signal.

5. An apparatus for providing speech recognition in a telephone system comprising:

a plurality of user communication devices including a first user communication device;

a central unit responsive to said plurality of user communication devices through which speech and non-speech signals are communicated;

a telephone network apparatus communicating with said central unit said telephone network apparatus including:

first means for sending a telephone channel signal for evaluating a telephone channel communicating with said first user communication device;

second means for obtaining a magnitude related to a time delay based on said telephone channel signal and an echo signal related to said telephone channel signal;

an adaptive filter, responsive to said second means for determining values for a bulk delay parameter and one or more variable tap coefficients;

an echo cancellation unit electrically connected to said adaptive filter for canceling an echo signal received from said central unit;

means for obtaining attenuation data using at least one of said telephone channel signal and said echo signal;

means for determining whether echo cancellation should be performed based on said attenuation data;

speech recognition means for recognizing a speech signal from said first user communication device; and control means for controlling sending and receiving of signals relative to said central unit and said user devices.

6. An apparatus, as claimed in claim 5, said telephone network apparatus further including:

means for bypassing said adaptive filter and said echo cancellation unit whenever said means for determining determines that echo cancellation should not be performed.

7. An apparatus, as claimed in claim 5, wherein:

said means for obtaining attenuation data includes:

a matched filter for filtering said echo signal with a time reversed version of said telephone channel signal to create an output signal; and means for obtaining an amplitude of the largest peak of said output signal and an amplitude of the next largest peak of said output signal; and said means for determining includes:

means for determining a ratio using said amplitude of the largest peak and said amplitude of the next largest peak; and means for comparing said ratio to a threshold value.

8. An apparatus, as claimed in claim 5, wherein:

said means for obtaining attenuation data includes:

a matched filter for filtering said echo signal with a time reversed version of said telephone channel signal to create an output signal; and means for obtaining an amplitude of the largest peak of said output signal and an amplitude of said telephone channel signal; and said means for determining includes:

means for determining a ratio using said amplitude of the largest peak of said output signal and said amplitude of said telephone channel signal; and means for comparing said ratio to a threshold value.

9. An apparatus, as claimed in claim 8, wherein:

said means for determining a ratio includes:

means for determining an estimate of an amplitude of said echo signal using said amplitude of the largest peak of said output signal and said amplitude of said telephone channel signal; and means for determining a ratio of said estimate of said amplitude of said echo signal to said amplitude of said telephone channel signal.

* * * * *

UNITED STATES PATENT AND TRADEMARK OFFICE
CERTIFICATE OF CORRECTION

PATENT NO. : 5,761,638
DATED : June 2, 1998
INVENTOR(S) : Curtis D. Knittle; Paul D. Jaramillo; Frank H. Wu It is certified that error appears in the above-identified patent and that said Letters Patent is hereby corrected as shown below:

On the title page, item [73]:

add Assignee: U S WEST, Inc., Englewood, Colorado

Signed and Sealed this

Twenty-second Day of June, 1999

Attest:

Q. TODD DICKINSON

Attesting Officer     Acting Commissioner of Patents and Trademarks